(12) United States Patent
Goodman (10) Patent No.: US 11,583,146 B2
(45) Date of Patent: Feb. 21, 2023

(54) DEVICE FOR OPENING COCONUTS

(71) Applicant: David L. Goodman, Austin, TX (US)

(72) Inventor: David L. Goodman, Austin, TX (US)

(73) Assignee: EZ-COCO LLC, Buffalo, WY (US)

( * ) Notice: Subject to any disclaimer, the term of this patent is extended or adjusted under 35 U.S.C. 154(b) by 0 days.

(21) Appl. No.: 14/202,546

(22) Filed: Mar. 10, 2014

(65) Prior Publication Data

US 2015/0056353 A1  Feb. 26, 2015

Related U.S. Application Data

(63) Continuation of application No. PCT/US2013/055886, filed on Aug. 20, 2013.

(51) Int. Cl.
*A47J 43/26* (2006.01)

(52) U.S. Cl.
CPC ..................... *A47J 43/26* (2013.01)

(58) Field of Classification Search
CPC ............ B26B 3/00; A47D 43/00; A47J 43/26
USPC ............... 426/518; 99/544; 30/113.1, 113.2, 30/113.3, 340; D7/693–696
See application file for complete search history.

(56) References Cited

U.S. PATENT DOCUMENTS

| | | | | |
|---|---|---|---|---|
| 1,277,308 A * | 8/1918 | Gunturiz | | 30/130 |
| 1,293,351 A * | 2/1919 | Creasey | | 30/113.1 |
| 1,409,638 A * | 3/1922 | Zetterman | | 30/167 |
| 1,530,822 A * | 3/1925 | Gibson | | 30/279.2 |
| 1,848,985 A * | 3/1932 | Yahn | | 30/316 |
| 2,041,386 A * | 5/1936 | Laanen, Jr. | | 30/241 |
| 2,188,362 A * | 1/1940 | Krilow | | 30/113.3 |
| 2,557,191 A * | 6/1951 | King | | 30/316 |
| 2,683,312 A * | 7/1954 | Dover | | 30/302 |
| 2,990,615 A * | 7/1961 | Ohler | | 30/316 |
| 3,384,963 A * | 5/1968 | Brando | | 30/280 |
| 4,199,841 A * | 4/1980 | Jaccard | | 452/146 |
| 4,257,144 A * | 3/1981 | Takegoshi et al. | | 452/146 |
| 4,596,073 A * | 6/1986 | Ewald | | 30/113.1 |
| 4,848,309 A * | 7/1989 | Alderete | | 125/40 |
| 4,903,407 A * | 2/1990 | Fischer | | 30/113.1 |
| 4,905,375 A * | 3/1990 | Braswell | | 30/316 |
| 5,056,223 A * | 10/1991 | Buck et al. | | 30/113.1 |
| D355,339 S * | 2/1995 | Aulbers et al. | | D7/696 |
| 6,997,796 B1 * | 2/2006 | Wangler | | 452/102 |
| 7,862,408 B1 * | 1/2011 | Weinstein | | 452/146 |
| 8,635,949 B2 * | 1/2014 | Barrett | | 99/544 |
| 2003/0037440 A1 * | 2/2003 | Raz | | 30/113.1 |
| 2005/0274242 A1 * | 12/2005 | McMahon et al. | | 83/13 |
| 2007/0294894 A1 * | 12/2007 | Hershey et al. | | 30/113.1 |
| 2010/0124595 A1 * | 5/2010 | Pattenden | | 426/518 |
| 2011/0036249 A1 * | 2/2011 | Barrett | | 99/544 |
| 2011/0120320 A1 * | 5/2011 | Ukani | | 99/576 |
| 2011/0138630 A1 * | 6/2011 | Tweg | | 30/113.1 |

(Continued)

FOREIGN PATENT DOCUMENTS

WO  WO-2012071628 A1 *  6/2012  ............. A47J 17/00

*Primary Examiner* — Steven N Leff (74) *Attorney, Agent, or Firm* — Jayne Saydah, Esq.

(57) ABSTRACT

The subject invention is a device for opening coconuts that includes a handle and a cutting cylinder attached to the handle, including a cutting edge at one end, and a cap that provides a striking surface. The cutting cylinder may have teeth and may have a gap. The cutting cylinder or the teeth may be beveled.

16 Claims, 6 Drawing Sheets

(56) References Cited

U.S. PATENT DOCUMENTS

2013/0291387 A1\* 11/2013 Kerkhof et al. ............. 30/113.3
2020/0375387 A1\* 12/2020 Zhang ...................... A23N 5/03

\* cited by examiner

DEVICE FOR OPENING COCONUTS

BACKGROUND

The term Thai coconut, or young Thai coconut refers to a young coconut that is harvested for consumption before it is fully mature. Thai coconuts are cut into a specific shape prior to shipment in which the top, or crown, is pointed and the bottom is flat. Thai coconuts are an increasingly popular grocery item, and yet the process of opening them is both dangerous and difficult.

There are two popular techniques for opening young Thai coconuts. Both have significant drawbacks. The first method is to hold a coconut in place on a table or in the open air with one hand. With the other hand, a machete or knife edge is repeatedly struck against the pointy crown of the coconut, as the coconut is rotated, to create a roughly circular opening. The husk is quite hard, so the blows must be quite forceful and must often be repeated, increasing the risk of injury to the hand that is holding the coconut in place. The hole created can be quite uneven and unattractive, with sharp edges created from the uneven blows. The whole process can take from 15-60 seconds or more depending on the coconut.

The second technique is safer but takes significantly more time than the first technique. The coconut is laid on its side and the fibrous, white exterior is sliced off using a sharp knife. This requires dozens of thin slices, typically creates a mess on the counter, and typically takes well over a minute to complete. Then either a small wedge or a sharp blow is cut into the exposed husk, and a hole is created. This technique may result in leakage and is typically messy and time consuming. In addition, the person doing the cutting incurs a risk of cutting his/her hand.

Therefore, a safe, easy, and effective device for opening young Thai coconuts as well as fruits, vegetables, nuts, or other food items is desirable.

SUMMARY OF THE INVENTION

The subject invention is an efficient, safe device for opening coconuts, primarily Thai coconuts, as well as other suitable fruits, vegetables and nuts. In a preferred embodiment, the invention, referred to as an opener, includes a cutting cylinder with a top, or cap, on one end and a cutting edge at the other end. The cylinder is attached to a handle. In use, a person places the cutting edge of the cylinder on the top or crown of a coconut and uses a hammer, mallet or other object to strike the top of the cylinder which in turn exerts concussive force against the coconut crown and results in the cutting edge cutting or cracking the crown of the coconut. The opener is then pried off, cleanly and safely exposing the insides of the coconut for consumption.

The device opens a coconut faster, and creates a more consistently sized opening, and is safer than the traditional techniques of opening Young Thai Coconuts using a knife or machete. The opening easily allowing a spoon to fit through and scoop out the pulp.

In certain embodiments, the cutting edge of the cylinder is sharpened or beveled. The bevel may be on either or both sides. In certain embodiments, the cutting edge includes relatively small sharpened teeth. In other embodiments, the cutting edge comprises the cylinder alone, without teeth.

In certain embodiments, there is a gap in the cutting edge on the side of the cylinder where the handle attaches. However, in other embodiments there is no gap, and in yet other embodiments the gap is in other locations along the cutting edge of the cylinder.

In certain embodiments, the cap of the cutting cylinder is a circular disk. The disk may be annular, i.e. it may have an opening in it for the coconut crown to stick through. In other embodiments, the cap has no opening. In yet other embodiments, there is no cap and the cylinder is struck directly with a striking object.

The handle can be either attached to the side of the cylinder or to the roof itself.

In certain embodiments, "flanges" or other protrusions can extend off the side of the cutter, either from the cap or from the sides of the cutting cylinder. Flanges may extend either internally, i.e. within the cylinder, or externally, i.e. away from the cylinder. Flanges may be used to help pry the opening device out of a coconut should it become stuck or to secure the coconut crown inside the cutter while it is being pried off.

In certain embodiments, the extended handle can include a foam, rubber, or other "grip" for ease and comfort. The handle can also include a device for dampening vibrations experienced during striking of the cutter by the beater.

In certain embodiments, the handle may be attached to the cylinder to facilitate better leverage for prying out the portion of the coconut to be removed, including the coconut crown. In certain embodiments, the handle may be attached to the cylinder at an angle of about 90 degrees; however, greater or smaller angles are further contemplated by the embodiments herein, so long as they facilitate better leverage or comfort for the user. For example, in various embodiments the angle may be from about 75 to about 105 degrees.

In certain embodiments, protrusions may be added to the interior of the cylinder to facilitate lifting of the coconut cap. These can be extended diagonal cutting metal "teeth" placed interior to the cylinder that penetrate and lift the shell during cutting. They can also be large, flat or angled metal protrusions that assist in gripping the cap during cutting and prying. Protrusions may also extend from the outside of the cutting cylinder, for example to create a leverage point for prying off the lid.

In certain embodiments, the technology is directed to a method of creating an opening in an item of food, the method including obtaining a device comprising a cutting cylinder having a cutting edge at one end and a cap at the other end that provides a striking surface, contacting the cutting edge of the device with the outer surface of an item of food, and striking the striking surface of the device with an amount of force sufficient for the cutting edge to penetrate the item of food, such that the cutting edge creates an opening in the outer surface of the item of food.

BRIEF DESCRIPTION OF THE DRAWINGS

The present invention will be more fully understood and appreciated from the following detailed description, taken in conjunction with the drawings in which.

DETAILED DESCRIPTION

The invention will be more completely understood through the following detailed description, which should be read in conjunction with the attached drawings. Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

As used herein the following term has the meaning given below:

Coconut—refers to different types of coconuts, of different sizes, shapes and states of maturity. While it is anticipated that the subject invention will be especially effective for opening Thai coconuts, also referred to as young Thai coconuts, or simply young coconuts, it may also be used to open, crack or break any coconut. Further, the invention is not limited to opening coconuts but may also be used to open other fruits, vegetables, nuts or other objects.

Item of food—refers to any fruit, vegetable, nut, legume or other item where it would be desirable to open or access its interior for consumption as food. Thus, a coconut is one example of an item of food.

Figure 1:
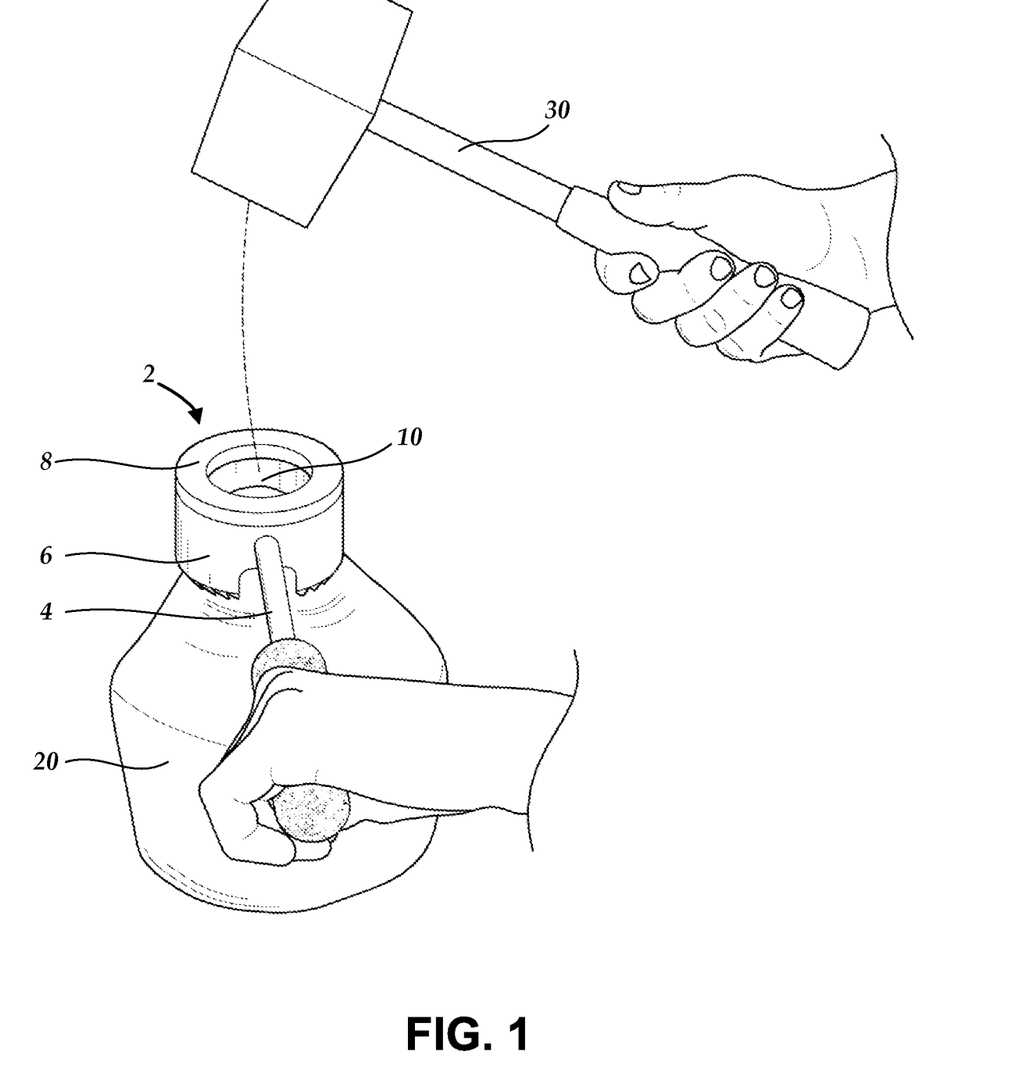
FIG. 1 illustrates how a person uses a preferred embodiment of the subject invention to open a coconut.

FIG. 1 illustrates how a person uses the preferred embodiment of the subject invention to open a coconut. In common use, a person will hold the subject device, referred to as opener 2, by its handle 4 using one hand. The person places opener 2 on the top, henceforth referred to as the crown, of a coconut 20 such that the crown of coconut 20 is within the opening of the bottom of a cutting cylinder 6 of opener 2. In a preferred embodiment, cutting cylinder 6 has an annular, or ring shaped, cap 8 with an opening 10 through which the crown of the coconut may poke through.

Using his/her other hand the person strikes cap 8 with a beater 30 one or more times. Beater 30 is outside the scope of the invention and may be a hammer, a mallet, a club, a baton, a stick, a brick, a stone, or any other suitable object or device. As a consequence of the striking, opener 2 exerts downward concussive pressure on coconut 20 which cracks the external husk of the coconut making the juice and pulp inside the coconut available for consumption.

It may be appreciated that the size and shape of coconuts vary based on the how they are cut prior to display in a market or other retail outlet. In some cases the crown will poke through cap 8 and in other cases the crown will not poke through cap 8. In some cases the crown will poke through only when opener 2 is forced downward as a consequence of being struck by beater 30.

In other embodiments, cap 8 may be an incomplete circle, or have an artistic shape or pattern around the hole in the center. In other embodiments, cap 8 may be convex or concave to facilitate various striking angles. In yet other embodiments, there may be no cap 8 or no opening 10.

Figure 2A:
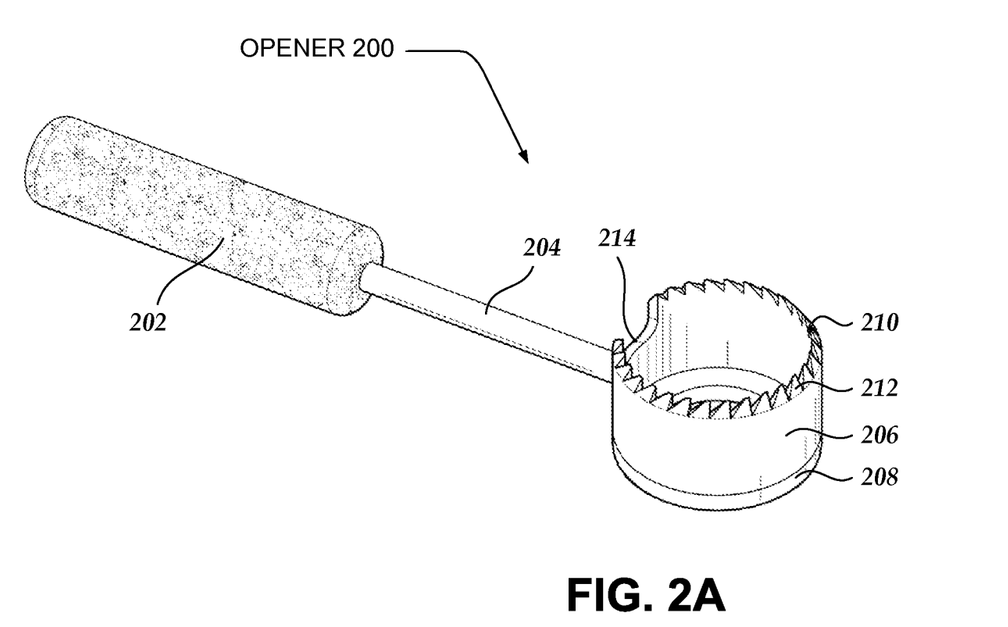
FIG. 2A is an isometric illustration of a preferred embodiment of a device for opening a coconut as seen from the bottom.

FIG. 2A is an isometric illustration of a preferred embodiment of the bottom of a device for opening a coconut, referred to as opener 200. Opener 200 is an embodiment of opener 2. Opener 200 is formed of handle 204 and cutting cylinder 206. Handle 204 may be made of metal, wood, hardened rubber, plastic or another suitable material. In a preferred embodiment, handle 204 is formed out of a separate piece of material and is attached to cutting cylinder 206 via weld, rivet, or other means of attachment. In another embodiment, the handle and cutting cylinder are made out of one piece of metal. In certain embodiments, the length of handle 204 is about 9 inches. Handle 204 lengths in the range of about 4 to 14 inches are also acceptable. Handle 204 may be attached either to the side of cylinder 206 or to a cap 208, which is an embodiment of cap 8 in FIG. 1.

In certain embodiments, a grip 202 is affixed to handle 204. Grip 202 may be made of plastic, cork, rubber or another suitable material. One end of grip 202 is near the end of the handle, opposite the point of attachment with cutting cylinder 206. Grip 202 may extend partially along the length of handle 204, as depicted in FIG. 2; alternatively grip 202 may extend along the entire length of the handle 204.

In certain embodiments, cutting cylinder 206 is made of stainless steel. In other embodiments, it is made of another rigid material such as aluminum or hardened plastic. In yet another embodiment, the diameter of cutting cylinder 206 is approximately 2⅝". Generally, embodiments have a cylinder diameter in the range of about 2" to 5", but other diameters are also acceptable. In certain embodiments the height of cutting cylinder 206 is about 1¾ inches. Generally, heights are in the range of 1 inches to 4 inches are preferred but other heights are also acceptable. In certain embodiments, the wall of cutting cylinder 206 is about ⅛ of an inch thick; generally embodiments have thicknesses in the range of about ¹⁄₃₂ to ⅜ of an inch. Other thicknesses are also acceptable, depending on the material used for cutting cylinder 206, as long as cutting cylinder 206 is sufficiently resistant to withstand the shock of being struck repeatedly with beater 30. Either the inside or outside wall of cutting cylinder 206 may be sloped to facilitate gripping or fitting of the coconut crown. For example, the inside wall of cutting cylinder 206 may be sloped toward the cutting edge.

Cutting cylinder 206 has a cutting edge 210 at one end that makes contact with coconut 20. Cap 208 is at the other end of cutting cylinder 206. In certain embodiments cutting edge 210 has teeth 212 that assist in gripping and cracking a coconut. In other embodiments, as described with reference to FIG. 7, there are no teeth. In other embodiments, cutting edge 210 may be beveled and or sharpened. In other embodiments, there may be any combination of toothed or un-toothed sections along cutting edge 210.

In one embodiment, there is a gap 214 in cutting edge 210. Gap 214 is an area cut out or omitted from cutting edge 210. Gap 214 is typically from ½ to 2 inches in length but other sizes are acceptable. Gap 214 does not penetrate coconut 20 when cutting cylinder 206 is used to cut or crack coconut 20. This results in a section of the crown of coconut 20, remaining attached to coconut 20 after it is cracked or opened using the subject invention. This attached section creates a lid that may be used to reseal the top of the coconut in the event that a person wants to finish eating or drinking the coconut at a later time.

Figure 2B:
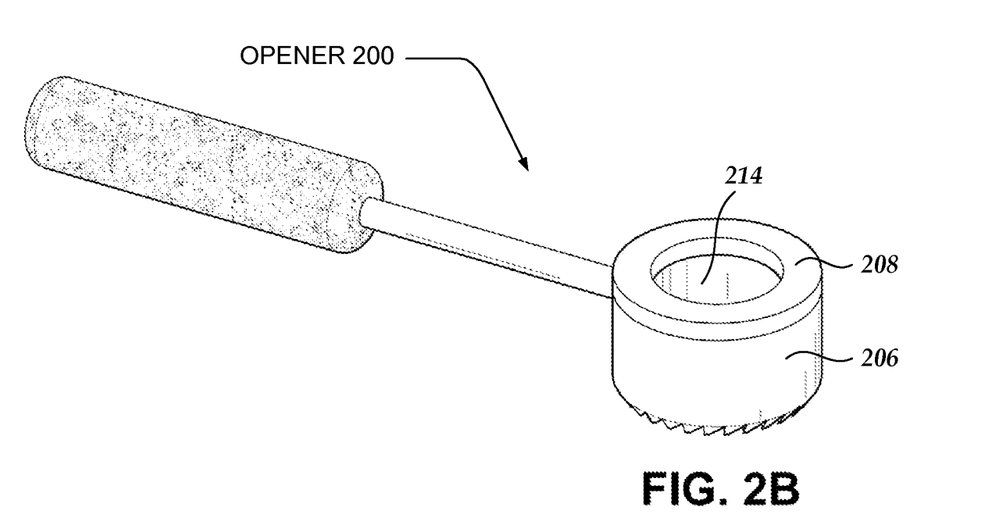
FIG. 2B is an isometric illustration of a preferred embodiment of the of a device for opening a coconut as seen from the top.

FIG. 2B is an isometric illustration of an embodiment of a device for opening a coconut, also depicted in FIG. 2A, and referred to as opener 200, as seen from the top. As illustrated, cap 208 provides a surface area on which to strike beater 30 against cutting cylinder 206. In one embodiment cap 208 is annular, or ring shaped, and thus includes a circular opening 214. Opening 214 allows the coconut "peak" to stick through, if necessary, and to assist in punching out or dislodging the coconut crown after cutting, if necessary. In one embodiment opening 214 is a circular hole with about a 1¾" diameter; but other diameters are acceptable. The gap may have any shape. In certain embodiments, the shape may be substantially rectangular, substantially square, substantially circular and may have any configuration of straight or curved sides. A gap of any shape and any size is contemplated within the present embodiments so long as it permits a section of the crown of the coconut 20 to remain attached to the coconut after opening.

In one embodiment, cap 208 is a separate piece that is attached to cutting cylinder 206 by weld, rivet, or other means of attachment. For example, cap 208 might be a metal gasket that is welded together with cutting cylinder 206. In another embodiment, cap 208 is manufactured as part of cutting cylinder 206. In certain embodiments, the thickness of cap 208 is from about 1⁄32 to ½ of an inch. In other embodiments, cap 208 has no opening 214 and is simply a disc. In yet another embodiment, cutting cylinder 206 has no cap 208 in which case a user directly strikes the top of cutting cylinder 206 with beater 30. In other embodiments, opening 214 is not circular in shape and its shape may be a semicircle, a ¾ circle, or other portion of a circle, or may be ovular or irregularly shaped.

In another embodiment, a ring made out of silicone, rubber, or another smooth impermeable material may be attached to the inside and/or outside of cutting cylinder 206 where it meets cap 208 in order to shield the joint crevices from contamination with food particles. This might take the form of a silicone o-ring that is inserted between cap 208 and cutting cylinder 206 before welding or affixed through gluing or by another process to the inside and/or outside of the cutting cylinder 206 where it meets cap 208 to fully cover up the weld seam between the two surfaces. This would allow less stringent welding requirements while still protecting the seam from any foreign food contaminants and preserving the food safety of the device.

While cutting cylinder 206 is generally depicted as a right circular cylinder in which the height is everywhere the same, in other embodiments it may have a different shape. For example, if the cutting side of cutting cylinder 206 is cut at an angle that is not at a right angle to its axis then cutting edge 210 will be elliptical in shape rather than circular. Generally, cutting edge 210 may be a regular shape such as a circle, an ellipse or a parabola, but may also be irregular in shape.

Figure 3A:
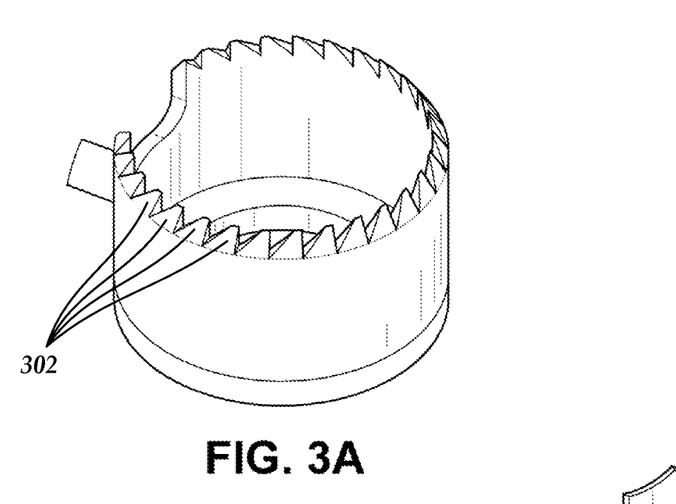
FIGS. 3A-C illustrate different embodiments of the teeth along the cutting edge of a device for opening coconuts.
Figure 3B:
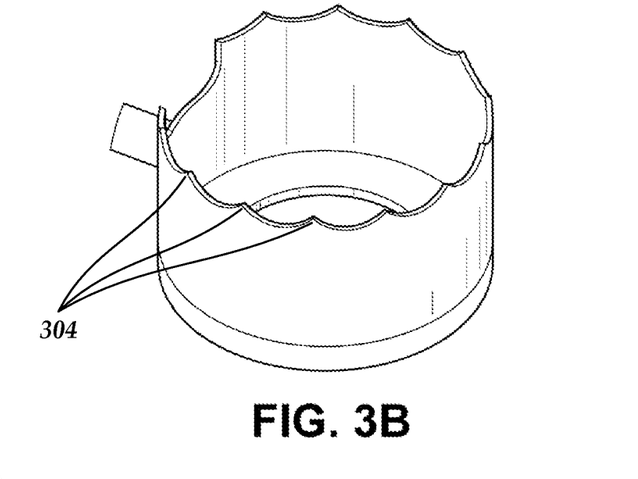

FIGS. 3A-B illustrate different embodiments of cutting teeth along a cutting edge of a device for opening coconuts. Essentially FIGS. 3A-C illustrate embodiments of teeth 212.

FIG. 3A illustrates further detail of a preferred embodiment of teeth along a cutting edge of a device for opening coconuts where the teeth are closely spaced. FIG. 3A is a detailed view of cutting edge 210 and teeth 212. In this embodiment, teeth 302 are beveled inwards at approximately a 30 degree angle and there are 27 teeth. In this embodiment, adjacent teeth 302 form a 30 degree angle and the length of the edge of each tooth 302 is in the range of 0.1 inches to 0.5 inches. Each tooth 302 is squared at the tip and the length of the squared tip is approximately 0.018 inches.

FIG. 3B illustrates an alternative embodiment of cutting teeth along a cutting edge of a device for opening coconuts in which the teeth are points 304 formed by the arcs of two adjoining sections of cutting edge 210. This embodiment has 13 teeth. Other embodiments may have longer arcs, resulting in as few as one or two teeth.

Figure 3C:
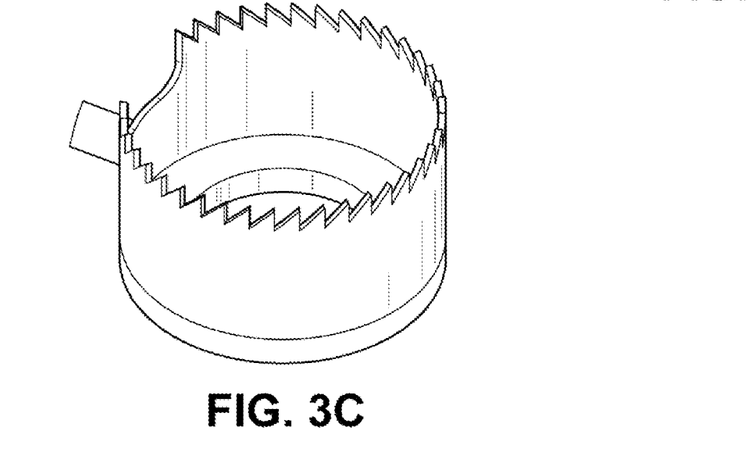

FIG. 3C is a detailed illustration of an alternative embodiment of the teeth of the device for opening coconuts illustrated in FIG. 3A. The teeth in FIG. 3C are saw-tooth in shape, are not beveled, and are more closely spaced than those in FIG. 3A or 3B.

It may be appreciated that there may be more or fewer teeth 212 along cutting edge 210 without departing from the spirit or scope of the subject invention. Further, teeth 212 may be more or less sharp, may be beveled on one or both sides and the degree of bevel may vary, and teeth 212 be of varying lengths. Further, teeth 212 may be of the style illustrated in FIG. 3A, or of the arced variety illustrated in FIG. 3B, or of the saw-toothed variety illustrated in FIG. 3C. Other styles of teeth 212 may also be used.

Figure 4:
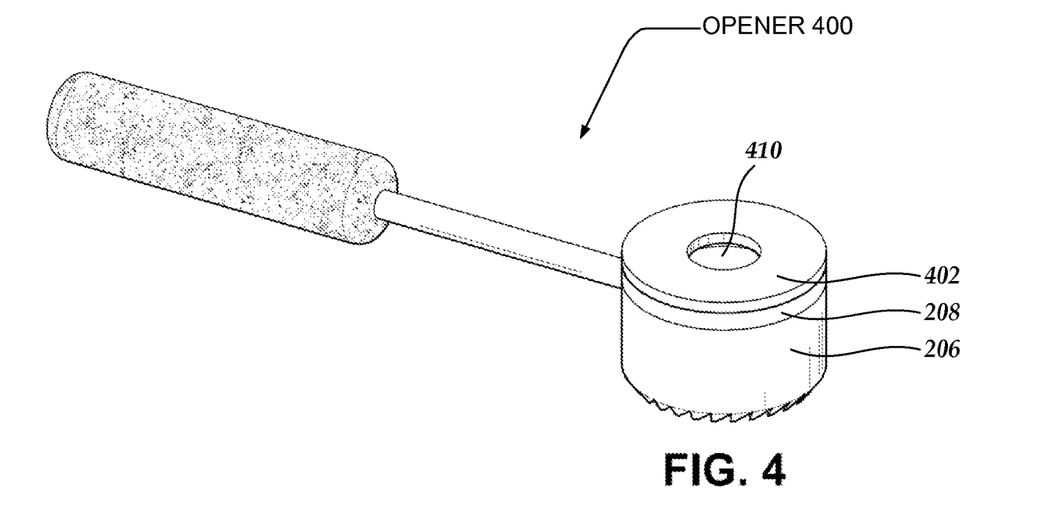
FIG. 4 illustrates one embodiment of a device for opening coconuts with a cushion on top of the cap of the cutting cylinder.

FIG. 4 illustrates one embodiment of a device for opening coconuts with a cushion on top of the cap of the cutting cylinder. Opener 400, is an embodiment of opener 200 that adds a cushion 402 on top of cap 208. In other respects, opener 400 is identical to opener 200.

In this embodiment, cap 208 is protected by affixing cushion 402 to cap 208. Cushion 402 partially cushions or absorbs the shock from striking beater 30 against cutting cylinder 206 via cap 208. In certain embodiments, cushion 402 is a standard rubber gasket or a cut piece of rubber. In other embodiments, cushion 402 may be made of plastic, urethane, silicone, or another durable material. Cushion 402 may be glued or otherwise affixed to cap 208. In other embodiments, cap 208 may be constructed of rubber which would obviate the need for a separate cushion 402.

Figure 5:
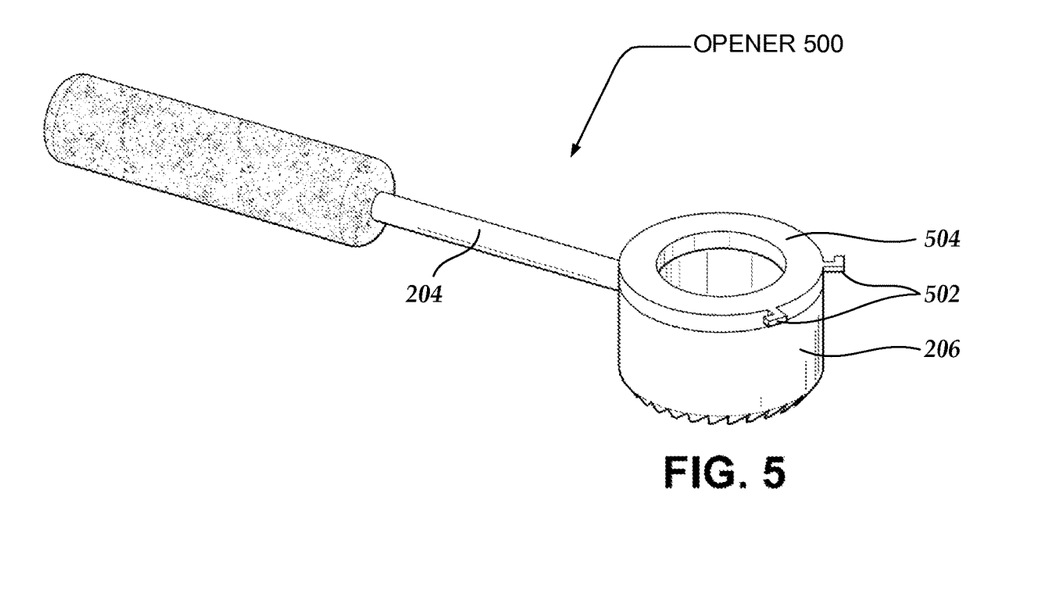
FIG. 5 illustrates one embodiment of a device for opening coconuts with flanges on the cap of the cutting cylinder.

FIG. 5 illustrates one embodiment of a device for opening coconuts with flanges, or protrusions, on the cap of the cutting cylinder. In this embodiment, referred to as opener 500, there are small protrusions, referred to herein as flanges 502, attached to a cap 504 on top of cutting cylinder 206 to aid in prying the cutter out of the coconut lid should it become stuck. In other respects, opener 500 is identical to opener 200. In this embodiment, cap 504 is an embodiment of cap 8 and cap 208. Flanges 502 can also be used to pry open the coconut once it has been cracked. Flanges 502 can be any shape or size. In other embodiments, flanges 502 emanate from cutting cylinder 206, and, in yet other embodiments, from handle 204.

Figure 6A:
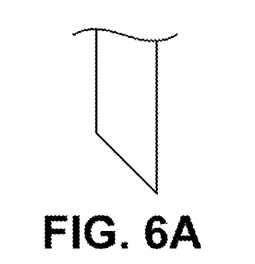
FIGS. 6A-F illustrate side views or profiles of several alternate embodiments of the cutting edge of a device for opening coconuts.
Figure 6B:
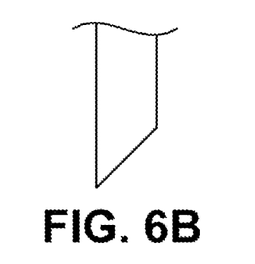
Figure 6C:
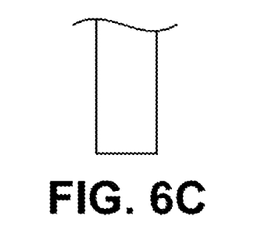
Figure 6D:
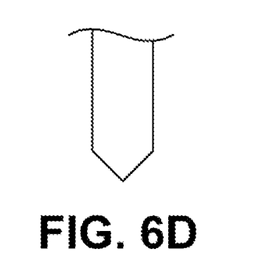
Figure 6E:
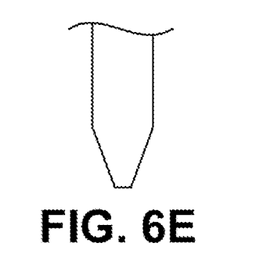
Figure 6F:
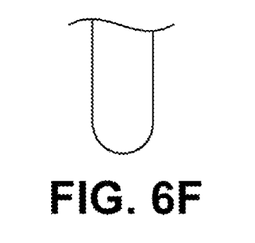

FIGS. 6A-F illustrate side views, or profiles, of several alternate embodiments of the cutting edge of a device for opening coconuts. The profiles may be used in embodiments of the subject invention, such as opener 200, that includes teeth as well as in embodiments such as opener 700 described hereinbelow that do not include teeth. FIG. 6A illustrates an embodiment of a profile of a cutting tooth that is beveled on the outside. FIG. 6B illustrates an embodiment of a profile of a cutting tooth that is beveled on the inside. FIG. 6C illustrates an embodiment of a profile of a cutting tooth with a square or un-beveled edge. FIG. 6D illustrates an embodiment of a profile of a cutting tooth that is beveled on each side or edge. FIG. 6E illustrates an embodiment of a profile of a cutting tooth which is beveled on each side and is squared off or blunted at the top. This embodiment allows increased sharpness for cutting but is safe for kitchen use as the cutting edge is blunted. FIG. 6E illustrates one option for incorporating a blunted edge, also referred to as a land. In certain embodiments the land is from about 0.005 to 0.015 inches but others sizes are acceptable. While FIG. 6E indicates a bevel on both sides of the land the bevel may also be on just one of the sides. FIG. 6F illustrates an embodiment of a profile of a cutting tooth which has a rounded edge. In general, the cutting teeth, or the cutting edge itself in embodiments where there are no teeth, may have a wide variety of bevels and shapes without departing from scope and spirit of the invention.

Figure 7:
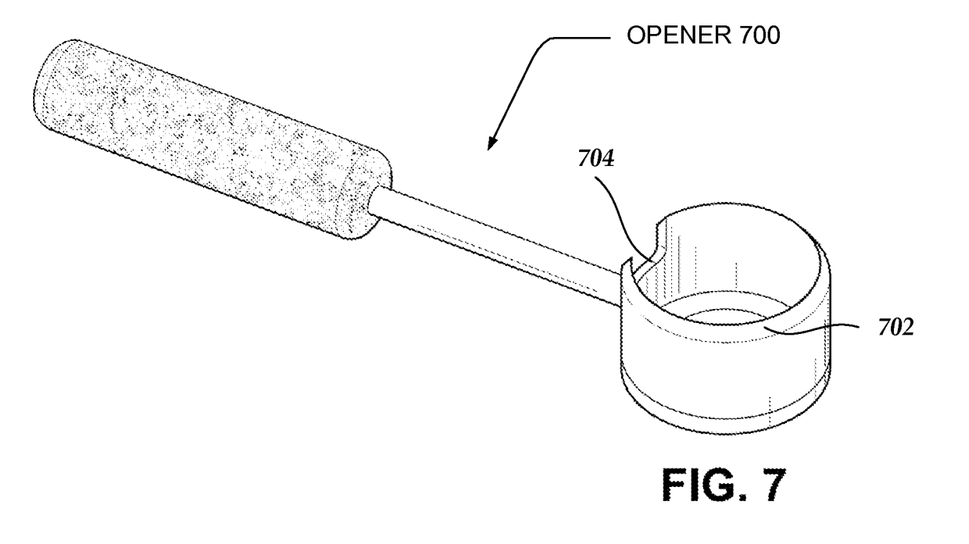
FIG. 7 illustrates one embodiment of a device for opening coconuts with an outside beveled cutting edge and no cutting teeth and a gap in the cutting edge.

FIG. 7 illustrates one embodiment of a device for opening coconuts that does not have cutting teeth. Opener 700 has an outside beveled cutting edge 702, no cutting teeth, and a gap 704 in the cutting edge. As previously discussed the bevel may be on the inside edge, the outside edge, or on both edges and may be relatively sharp or relatively dull. In this embodiment the gap in the cutting edge is shown on the same side of the handle. In other embodiments, there is no gap. In yet other embodiments, the gap may be a different size or shape, or be in a different location on the cutting edge.

In reading the above description, persons skilled in the art will realize that there are many apparent variations that can be applied to the methods and systems described. In particular, embodiments of the cutting edge may include various combinations of teeth, arcs, bevels, and gaps.

What is claimed is:

1. A single-cylinder device for opening a crown of a coconut outer shell, consisting of:
    a cutting cylinder including a circular bottom end including a cutting edge extending around a portion of said circular bottom end and a gap in the cutting edge extending around another portion of said circular bottom end, said cutting cylinder capable of penetrating said coconut outer shell when said cutting cylinder is placed on the top of said crown of a coconut outer shell;
    a circular top end on the cutting cylinder, the circular top end having a flat cap that provides a striking surface, said flat cap being configured to transfer a force from said striking surface to said cutting edge;
    a cylindrical surface extending axially between said circular bottom end and said circular top end;
    a cut out region in the circular bottom end and cylindrical surface, the cut out region extending radially across the gap in the cutting edge and axially from the circular bottom end edge into the cylindrical surface, wherein the cut out region and gap are configured to prevent said cutting cylinder from cutting said crown of a coconut outer shell proximal to said gap resulting in a section of the crown of the coconut proximal said gap remaining attached to the coconut after the coconut is opened; and
    a handle directly connected to an outside of the cylindrical surface, the handle extending outwardly and perpendicular to the axis of said cutting cylinder.

2. The device of claim 1, wherein the handle is about 4 to 14 inches in length.

3. The device of claim 2, wherein the handle includes a grip.

4. The device of claim 1, wherein the diameter of the cutting cylinder is at least 1¾ inches.

5. The device of claim 1, wherein the cut out region is longitudinally aligned with the handle attached to the outside of the cylindrical surface.

6. The device of claim 1, wherein the flat cap extends inwardly from the circular top end.

7. The device of claim 1, wherein the gap is a single gap, and
    wherein the circular bottom end further comprises a circumference defined entirely by the cutting edge and the single gap.

8. A device for cutting a coconut, the device consisting of:
    a tubular element including a top end, a bottom end and a wall extending therebetween, the wall including an exterior surface and an interior surface, the interior surface defining a central opening extending longitudinally through the bottom end, tubular element and top end;
    a cutting edge and a recessed non-cutting edge on the bottom end and surrounding the central opening, the recessed non-cutting edge defining a gap in the bottom end and wall, the gap extending from the cutting edge into the wall towards the top end, the recessed non-cutting edge configured to prevent an area of coconut, corresponding to the gap, from being cut resulting in the area of the coconut corresponding to said gap remaining attached to the coconut after the coconut is opened;
    a laterally extending surface on the top end of the tubular element, the laterally extending surface configured to receive force and transfer the force through the tubular element to the cutting edge; and
    a handle attached to the exterior surface of the tubular element such that a longitudinal distance between the recessed non-cutting edge and the handle is fixed and a longitudinal length between the cutting edge and the handle is fixed, the handle extending substantially perpendicular to the wall of the tubular element.

9. The device of claim 8, wherein the laterally extending surface surrounds the central opening.

10. The device of claim 9, wherein the laterally extending surface surrounding the central opening extends inwardly towards the central opening.

11. The device of claim 8, wherein the tubular element is annular or cylindrical.

12. The device of claim 8, wherein the handle is attached to the exterior surface at a position on the exterior surface and the gap is longitudinally aligned with the position.

13. The device of claim 8, wherein the handle has a width and the gap extends radially in the wall at least as long as the width of the handle.

14. The device of claim 8, wherein the laterally extending surface extends laterally and perpendicular to the wall and central opening.

15. The device of claim 8, wherein the recessed non-cutting edge defines a single gap, and
    wherein the bottom end defines a perimeter that entirely surrounds the central opening, and the single gap and cutting edge define the perimeter that entirely surrounds central opening.

16. A cutting device for partially cutting into a fruit, the device consisting of:
    a tubular element including a top end, a bottom end and a wall extending therebetween, the wall including an outer surface and an inner surface, the inner surface defining a central opening extending longitudinally through the bottom end, tubular element and top end;
    a cutting edge on the bottom end, the cutting edge extending between two ends and around a perimeter of the bottom end;
    a single cut out in the wall of the tubular element, the single cut out extending laterally between the two ends of the cutting edge and longitudinally through the wall towards the top end, and the cut out extending around the perimeter of the bottom end, wherein the cutting edge and single cut out define the entire perimeter of the bottom end to prevent an area of the coconut, corresponding to said single cut out, from being cut, resulting in a section of the coconut proximal said single cut out remaining attached to the coconut after the coconut is opened;

a flat surface on the top end, the flat surface defining the central opening at the top end such that the central opening at the top end is narrower than the central opening at the bottom end; and a handle attached directly to the outer surface of the tubular element, the handle extending outwardly from the wall of the tubular element.

\* \* \* \* \*